April 5, 1960  A. B. McEACHERN  2,931,460
DEBRIS GUARD

Filed Dec. 12, 1957  3 Sheets-Sheet 1

INVENTOR
A. B. McEACHERN
BY: Maybee & Legris
ATTORNEYS

April 5, 1960  A. B. McEACHERN  2,931,460
DEBRIS GUARD
Filed Dec. 12, 1957  3 Sheets-Sheet 2
FIG. 3
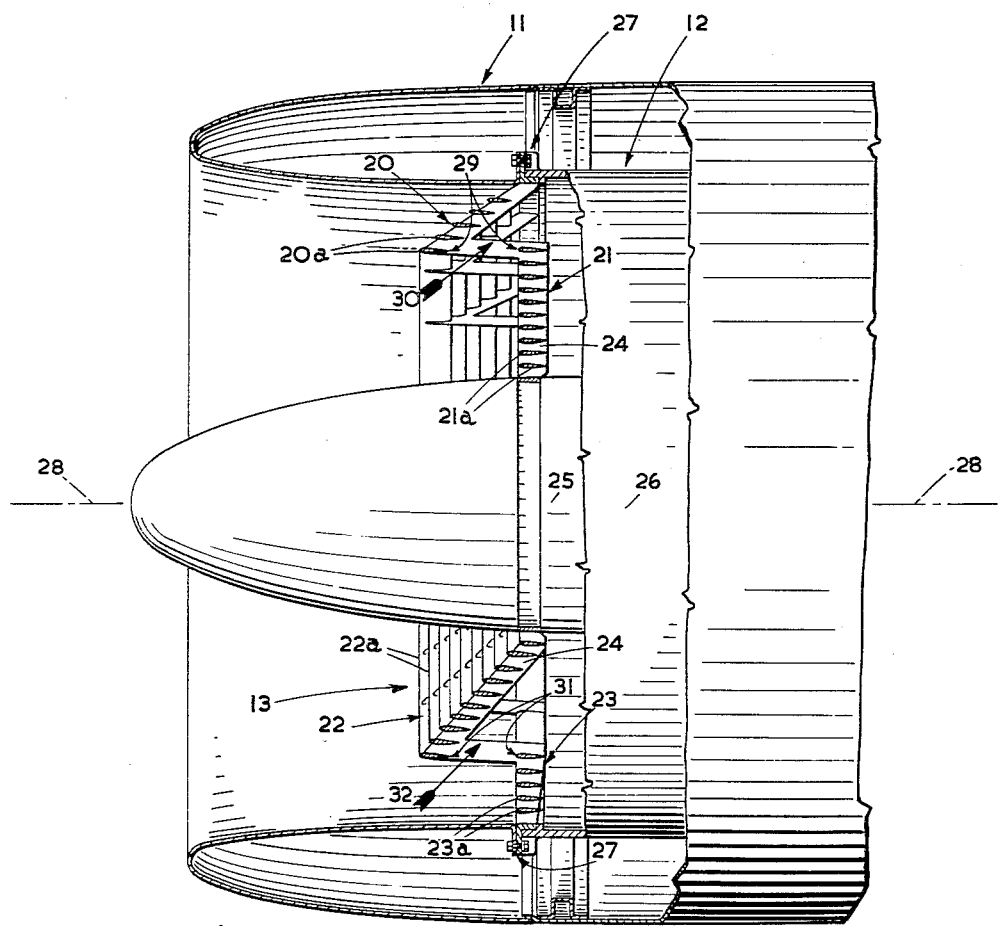
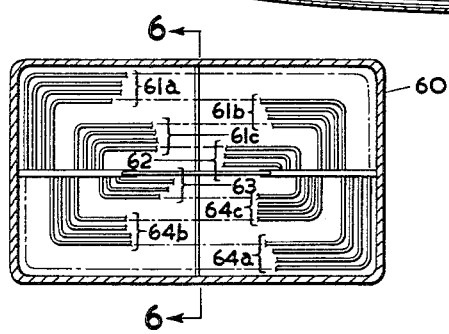
FIG. 5
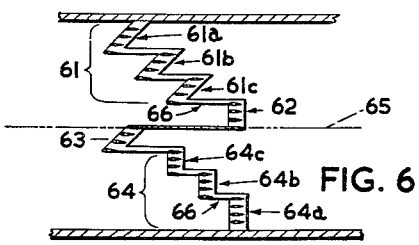
FIG. 6
INVENTOR
A. B. McEACHERN
BY: *Maybee & Legris*
ATTORNEYS April 5, 1960     A. B. McEACHERN     2,931,460
DEBRIS GUARD Filed Dec. 12, 1957     3 Sheets-Sheet 3

*INVENTOR*
*A. B. McEACHERN*
BY: *Maybee & Legris*
*ATTORNEYS*

United States Patent Office 2,931,460
Patented Apr. 5, 1960

2,931,460

DEBRIS GUARD

Alexander Benjamin McEachern, Rexdale, Ontario, Canada, assignor to Orenda Engines Limited, Malton, Ontario, Canada, a corporation Application December 12, 1957, Serial No. 702,343

10 Claims. (Cl. 183—70)

This invention relates to a debris guard for an air-intake duct having a longitudinal axis normally positioned in a substantially horizontal plane, and while not limited thereto, is particularly concerned with a debris guard for an air-intake duct of a gas turbine engine of an aircraft.

As will be readily appreciated, where the air-intake duct forms part of a stationary ground installation, the duct may be arranged for its longitudinal axis in the vicinity of the debris guard to remain in a truly horizontal plane, but, where the duct forms part of a prime mover of a vehicle, the attitude of which is dependent on maneuvering of the vehicle, the longitudinal axis of the duct may on occasions lie in a plane which is other than truly horizontal.

For example, where the vehicle is an automobile, armoured vehicle or locomotive, the terrain or gradient over which the vehicle is travelling will influence the attitude of the axis of the duct with respect to a truly horizontal plane, and, more particularly, where the vehicle is an aircraft, maneuvering of the aircraft will greatly influence the attitude of the axis of the duct with respect to a truly horizontal plane.

To provide for the eventuality that the said longitudinal axis may on occasions lie in a plane which is other than truly horizontal, the term "normally positioned in a substantially horizontal plane" is used herein and in the appended claims to denote that the said longitudinal axis lies in a plane which is horizontal or closely approaches the horizontal when the vehicle is standing on a horizontal surface, or, in the case of an aircraft, when the aircraft is in horizontal flight, the term "normally" being used in this context as an antonym of "abnormally" and not as a synonym for "perpendicular to."

As will later appear, the said longitudinal axis and the said horizontal plane provide a datum with respect to which the respective positions of various elements providing the debris guard according to the invention are defined.

Debris guards for air-intake ducts have been previously proposed, and those guards may be classified in two main groups. The debris guards of the first group include a continuous grille which masks the duct and is rigidly located with respect to the duct, and the debris guards of the second group include a plurality of sub-grilles which are movable between a position in which they mask the duct to a position in which they are exterior to the duct.

In the case of debris guards of the kind included in the first group, there is a danger that the debris guard may become clogged with debris to an extent seriously restricting the flow of air through the intake duct, and in the case of debris guards of the kind included in the second group and which are commonly used in conjunction with aircraft engines, a mechanism must be provided for moving the sub-grilles between their two extreme positions, which mechanism is complex, bulky and heavy, and imposes design limitations on the aircraft. Also, where the debris guards of the second group are used in conjunction with the engines of aircraft, the sub-grilles must be withdrawn from the duct should the aircraft encounter atmospheric conditions in which ice accretions commence to build up on the grilles, and this gives rise to an additional disadvantage that the air-intake duct is then left unmasked and completely unprotected.

The object of the present invention is to mitigate the above-mentioned disadvantages.

According to the invention, the debris guard for an air-intake duct comprises means for permitting a flow of air in a direction axially of the duct and for impeding or preventing the passage of discrete bodies of above a predetermined size in all directions downstream of the duct other than in a direction which is transverse to and inclined upwardly of a horizontal plane which includes the axis of the duct, while at all times providing for the unobstructed passage of a flow of air in said direction which is transverse to and inclined upwardly to said horizontal plane.

Throughout the following specification and claims, various terms are used which if left unqualified may cause confusion to the reader, and, to avoid such confusion, it is felt desirable now to set out a glossary to which the reader may have ready reference:

The term "duct" is used herein to mean a space bounded by at least one tubular wall, the wall, when viewed in transverse cross-section being of any shape intermediate a slit having its major width lying in a substantially horizontal plane to a slit having its major width lying in a substantially vertical plane, and encompasses all intermediate transverse cross-sectional shapes such as a square, a rectangle, a trapezium, a rhombus or a rhomboid, a polygon, an ellipse, a flattened ellipse, or a true circle, and, where the space is defined by a plurality of tubular walls of different diameter for the space to be of the general form of an annulus when viewed in transverse cross-section, the inner and outer walls may be concentric or eccentric about a common longitudinal axis. As will be readily appreciated, the configuration of a transverse cross-section of a wall defining an air-intake duct is dependent on the design characteristics of the duct and of the surrounding structure, and the term "duct" is therefore used herein to include any space bounded by a tubular wall, which wall, when viewed in transverse cross-section, is a closed figure provided by any combination of lines and curves.

The term "longitudinal axis" is used herein to denote an axis contained by the wall or walls defining the duct, whether the walls be concentric or eccentric about that axis.

The term "transversely of the longitudinal axis of the duct" is used herein to denote that an element of the duct to which this term is applied may be arranged to be truly radial of the said longitudinal axis, or may be arranged to be other than truly radial, i.e., it may be inclined to the longitudinal axis.

The term "grille" is used herein to mean any form of reticule, grid, or like perforate member which will allow air to pass through it in a direction transverse to its major surfaces, but which will not permit discrete particles of above a certain size to pass between its major surfaces.

The term "at least simulating a sector of an annulus" is used herein to denote the shape bounded by the perimeter of the major surfaces of a grille of the debris guard, and encompasses a true sector of a planar or frusto-conical annulus, as will be the case where the said wall of the duct is truly circular in transverse cross-section, or such a true sector of an annulus when distorted for its perimeter to conform with a portion of the transverse cross-section of the said tubular wall.

The terms "upstream and downstream" are used herein to denote the relative positions of elements of the debris guard with respect to the direction of a flow of air axially of the duct.

The terms "upwardly directed" and "downwardly directed" are used herein to denote, respectively, an upward and downward direction transverse to the said normally horizontal plane.

The term "radial extent" is used herein to denote the distance from the said longitudinal axis of a point on an element providing the debris guard measured radially of the longitudinal axis, and, in the case of a truly circular or truly annular duct may be regarded as a synonym for "radius."

The foregoing and further objects and advantages of the invention will become apparent from a study of the following specification when taken in conjunction with the accompanying drawings, in which:

Figure 3 is a cross-sectional elevation taken on the line 3—3 of Figure 2 and to the same scale as Figure 2;

Figures 5 and 6 are diagrammatic line drawings illustrating how the debris guard of the invention may be applied to a rectangular duct, and also illustrating how certain of the grilles of the debris guard may be formed by a plurality of sub-grilles, as hereinafter described, Figure 5 being a section on the line 5—5 of Figure 6, and Figure 6 being a section on the line 6—6 of Figure 5.

Figure 1:
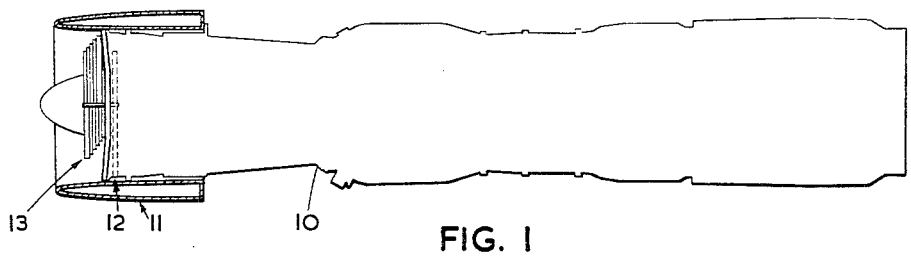
Figure 1 is a diagrammatic side elevation, partly in section, of a gas turbine engine incorporating a debris guard according to the invention.

Referring now to Figure 1, the gas turbine engine is indicated generally at 10, and a cowling for the engine is indicated at 11, the cowling surrounding the air-intake, or upstream end of the gas turbine engine, at which end is positioned the debris guard of the invention, indicated generally at 13.

Figure 2:
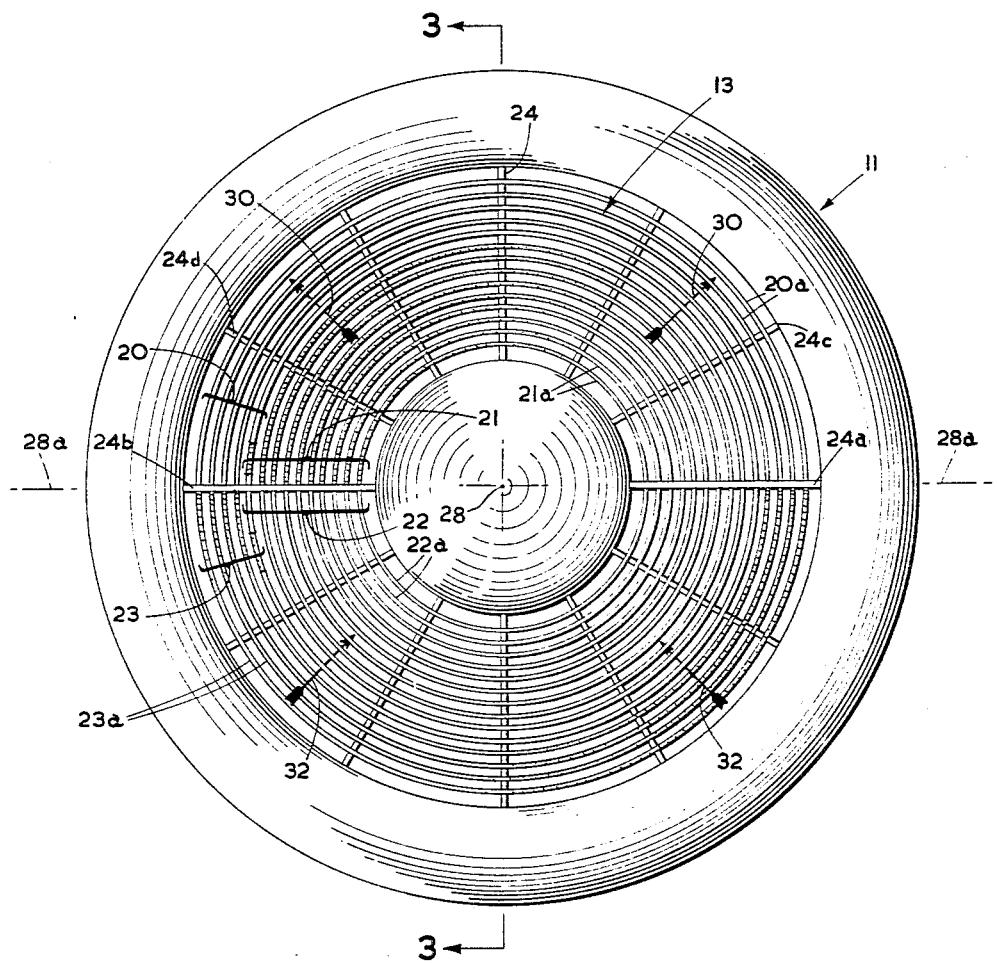
Figure 2 is a front elevation, to a larger scale than Figure 1 and taken from the left hand end of Figure 1, showing the debris guard in greater detail.
Figure 4:
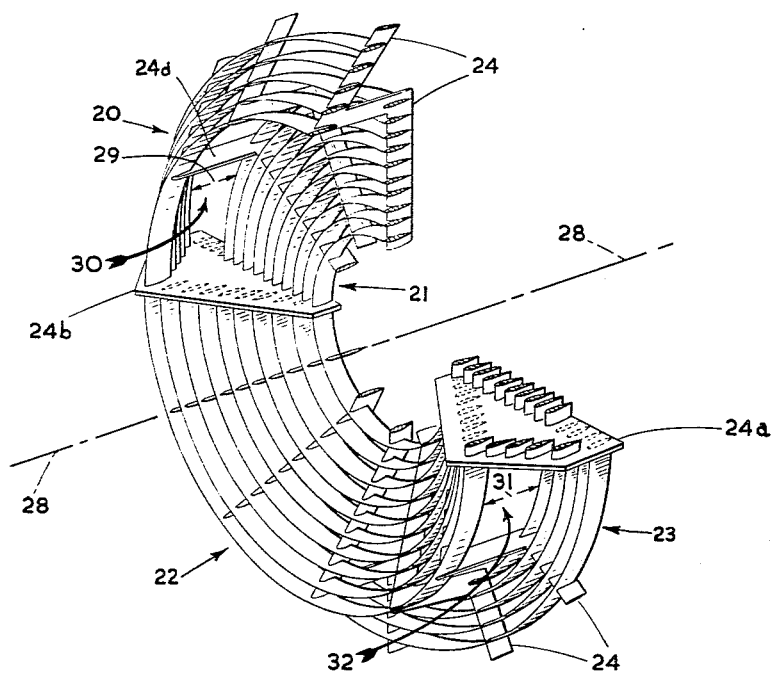
Figure 4 is a fragmentary perspective view showing the arrangement of concentric arcuate slats forming grilles of the debris guard of Figures 1, 2 and 3, and a baffle, hereinafter referred to in detail, providing a transition between adjacent ends of the grilles.

Referring now to Figures 2, 3 and 4, the debris guard includes four separate and distinct grilles, the first of which is indicated at 20, the second at 21, the third at 22, and the fourth at 23.

Each of the grilles 20 to 23 includes a series of concentric arcuate slats 20a, 21a, 22a, 23a, respectively, which are supported by struts 24 extending radially of the longitudinal axis of the engine from a wall 25 providing the inner wall of the duct to a wall 26 providing an outer wall of the duct, the struts being located against displacement axially or radially of the duct in any convenient manner as is indicated at 27.

As will be observed more particularly from Figures 3 and 4, the first grille, 20, is in the form of a sector of a frusto-conical annulus and extends transversely of the longitudinal axis of the duct, indicated at 28, from the outer wall 26 of the duct towards the inner wall 25 for its radially inner edge to lie upstream of its radially outer edge and intermediate the inner and outer walls 25, 26. The first grille extends in an arc about the axis 28 between a horizontal strut 24a and a horizontal strut 24b, both of which lie in a plane, indicated at 28a in Figure 2, which includes the axis of the duct, for the first grille to subtend an angle of 180°.

The second grille, 21, is in the form of a sector of a planar annulus, and extends transversely of the axis of the duct from the inner wall 25 of the duct towards the outer wall 26 for its radially outer edge to lie downstream of the radially inner edge of the first grille and intermediate the inner and outer walls 25, 26, the radially outermost slat 21a of the grille 21 being aligned axially of the duct with the radially innermost slat 20a of the grille 20. The second grille also subtends an angle of 180° about the longitudinal axis 28 of the duct, and also extends from the strut 24a to the strut 24b.

The third grille, 22, is in the form of a sector of a frusto-conical annulus and extends transversely of the axis of the duct from the inner wall 25, of the duct towards the outer wall 26 for its radially outer edge to lie upstream of its radially inner edge and intermediate the inner and outer walls 25, 26. The third grille is of equal radial extent to the radial extent of the second grille, 21, and extends in an arc of 180° about the axis 28 from the strut 24a to the strut 24b for it to provide, in conjunction with the second grille, 21, and when viewed in the direction axially of the duct, a continuous annular grille surrounding the inner wall 25.

The fourth grille, 23, is in the form of a sector of a planar annulus, and extends transversely of the axis of the duct from the outer wall 26 of the duct towards the inner wall 25 for its radially inner edge to lie intermediate the inner and outer walls 25, 26 and for its radially inner edge to lie downstream of the radially outer edge of the third grille, 22, the radially innermost slat 23a of the fourth grille 23 being aligned axially of the duct with the radially outermost slat 22a of the third grille 22. The fourth grille similarly subtends an angle of 180°, and extends from the strut 24a to the strut 24b for it to provide, in conjunction with the first grille, 20, and when viewed in a direction axially of the duct, a continuous annular grille lining the outer wall 26. The continuous annular grille provided by the first and fourth grilles, 20 and 23, in conjunction with the continuous annular grille provided by the second and third grilles, 21 and 22, provides a continuous annular grille completely masking the duct, as will be observed from a study of Figure 2.

Referring now to Figure 4, the struts 24a, 24b are each formed as baffles which are substantially triangular in plan for them to provide a transitional portion between the adjacent ends of the first, second, third and fourth grilles, 20 to 23, in which case the ends of the slats 20a–23a may be located by welding or otherwise securing them to their adjacent strut.

The spacing of the radially inner edge of the first grille from the radially outer edge of the second grille provides an unobstructed opening 29 between the first and second grilles, as will be apparent from a study of Figures 3 and 4, the opening 29 permitting direct access to that portion of the duct which is downstream of the debris guard only in a direction which is inclined upwardly of and transverse to the horizontal plane 28a containing the axis 28. This direction is indicated in the drawings by the arrows 30.

Also, a similar unobstructed opening 31 is provided by the spacing between the radially outer edge of the third grille, 22, and radially inner edge of the fourth grille, 23, the opening 31 similarly permitting direct access to that portion of the duct which is downstream of the debris guard only in a direction which is inclined upwardly of and transverse to the said horizontal plane 28a containing the axis 28, this direction being indicated in the drawings by the arrows 32.

The operation of the debris guard in use is as follows:

Under normal conditions, i.e., when the engine is operating and the debris guard is unobstructed, air is induced into the duct and flows axially of the duct between the slats 20a to 23a.

Should now a foreign body, such as a wrench, nut, or a piece of debris be dropped or sucked into the engine cowling, it will be intercepted by the slats of one of the grilles 20 to 23 and will in all probability be held against those slats by the force of the air passing between the slats, or, alternatively, it will fall across the upstream face of the grilles to the bottom of the interior wall of the cowling. Should the engine now be stopped, the foreign body will fall to the lowermost portion of the cowling if previously held against the slats by the air-stream, and will either roll out of the cowling along the inclined lower surface thereof shown in the drawings, or will come to rest in a position in which, should the engine be restarted without first removing the foreign body from the interior of the cowling, it will be held by the fourth grille 23 against displacement in a direction downstream of the duct.

As there are no openings between the grilles which are directed transversely and downwardly of the said horizontal plane containing the axis 28 (i.e. in the opposite direction to the arrows 30, 32) it is extremely difficult for the foreign body to obtain access to that portion of the duct which is downstream of the debris guard, for the grilles prohibit access to the interior of the duct downstream of the debris guard in all directions downstream of the duct other than one which is transverse to and inclined upwardly of the said horizontal plane 28a. However, as there is a remote possibility that a foreign body may lodge on the upper surface of one of the baffles provided by the struts 24a, 24b, and may subsequently roll or move across the upper surface of the baffle to behind the first grille 20, the struts 24a, 24b may be arranged for them to slope upwardly in a downstream direction, or, alternatively, they may be arranged to lie above the horizontal plane for them to subtend an angle above the horizontal plane which is less than 180°, for example, the grilles may be arranged to extend from the strut 24c to the strut 24d, in which case the struts 24c, 24d would be formed to provide the baffles, or the baffles could be dispensed with entirely.

It will be observed that the baffles mask the gaps occurring between the second and third and fourth grilles at their adjacent ends, to prevent foreign bodies from falling behind the third grille 22 in a direction perpendicular to and downwardly of the said horizontal plane 28a.

Should the engine be operating under atmospheric conditions where icing occurs in the intake of the engine, ice accretions will build up on the slats 20a to 23a, and will obstruct the gaps between the slats and may eventually completely block the gaps. As the openings 29 and 31 are of greater size than the gaps between the slats, they are far less subject to obstruction due to the build-up of ice accretions than are the gaps, so that when icing occurs on the slats, an alternative route is provided through the openings 30 and 32 for the air induced by the engine.

Should the debris guard incorporating the four grilles hereinbefore described be positioned in a duct having an outer wall which extends parallel to the longitudinal axis of the duct, the maximum effective area of the duct when the gaps of the grilles are completely obstructed by ice can not exceed 50% of the actual cross-sectional area of the duct in the vicinity of the debris guard. This is because the actual cross-sectional area of the duct minus the combined areas of the first and third grilles must equal the actual cross-sectional area of the duct minus the combined area of the second and fourth grilles if the maximum possible unobstructed path for the air passing through the duct is to be provided under complete icing conditions of the grilles. Where the wall of the duct is convergent in a downstream direction a maximum effective area of the duct under complete icing conditions can be obtained which is excess of 50% of the effective area of the duct in the vicinity of the second and fourth grilles, but in this event the maximum effective cross-sectional area of the duct obtainable can be no more than 50% of the actual cross-sectional area of the duct taken in the vicinity of the radially inner edge of the first grille and the radially outer edge of the third grille.

To enable the effective area of the duct under complete icing conditions to be increased to a value in excess of 50% of the effective cross-sectional area of the duct, the first and fourth grilles may be formed as a series of sub-grilles as is indicated in Figures 5 and 6.

In Figures 5 and 6, which are diagrammatic line drawings, the wall 60 of the duct is shown as being of rectangular transverse cross-section, and the duct is shown as being a tubular duct as opposed to an annular one.

The first grille is indicated at 61 as being provided by three sub-grilles 61a, 61b, 61c, the second grille is indicated at 62, the third at 63, and the fourth is indicated at 64 as being provided by three sub-grilles 64a, 64b, 64c.

Each of the grilles and sub-grilles, as previously described, is provided by a plurality of slats supported by struts 66 and is arranged concentrically about the longitudinal axis 65 of the duct, the radially outer slat of each grille being axially aligned with and arranged downstream of the radially inner slat of the next radially outer grille, for the grilles, in combination, and as is indicated in Figure 5, to completely mask the duct when the duct is viewed in an axial direction. As will be readily appreciated, and as indicated in Figure 6, the respective grilles and sub-grilles may be radially planar, or may converge towards the axis of the duct in an upstream direction from their edges remote from the axis of the duct to their edges closest to the axis of the duct.

By forming the first and fourth grilles as a plurality of sub-grilles, the effective cross-section of the duct under complete icing conditions can be greatly increased, for the second and third grilles can then be of less radial extent and thus mask an area of the duct under complete icing conditions which is substantially less than 50% of the actual cross-section of the duct, and, providing no single pair of sub-grilles 61a, 64a, or 61b, 64b, or 61c, 64c defines an area under complete icing conditions which is greater than the combined areas of the second and third grilles 62, 63, the effective cross-sectional area of the duct under complete icing conditions can be arranged to be determined solely by the combined areas of the second and third grilles, in which case the spaces between the respective grilles and sub-grilles will be arranged to be of a combined area in excess of the effective area of the duct under complete icing conditions.

Figures 5 and 6 also show the manner in which the debris guard of the invention may be applied to a tubular as opposed to an annular duct, and, in addition, Figure 5 provides a graphic example of what is meant by the term "at least simulating a sector of an annulus," for, as will be observed, each of the sub-grilles 61a–61c and 64a–64c has the general form of a sector of an annulus when distorted to conform with the transverse cross-section of the wall 60 defining the duct.

What I claim as my invention is:

1. A debris guard for an air-intake duct having a longitudinal axis normally positioned in a substantially horizontal plane, comprising means for permitting a flow of air in a direction axially of the duct and for impeding or preventing the passage of discrete bodies of above a predetermined size in all directions downstream of the duct other than in a direction which is transverse to and inclined upwardly to said horizontal plane, while at all times providing for the unobstructed passage of a flow of air in said direction which is transverse to and inclined upwardly to said horizontal plane, said means including a wall defining the duct, a first, a second, a third and a fourth grille each arranged transversely of the longitudinal axis of the duct for the grilles in combination completely to mask the duct when the duct is viewed in an axial direction, the first and fourth grille at least simulating a sector of an annulus, the major portion of each of the first and second grilles lying above a normally horizontal plane which includes the axis of the duct, the first grille extending from the wall defining the duct towards the duct axis, and the second grille extending outwardly of the axis of the duct towards the said wall, each of the first and second grilles being of less extent measured in a direction radially of the axis of the duct than the radial extent of the duct itself, that edge of the second grille which is remote from the axis of the duct being spaced downstream of that edge of the first grille which is closest to the axis of the duct to provide an air-intake by-passing the first and second grilles and being of at least equal radial extent to the radial extent of that edge of the first grille which is closest to the axis of the duct, the major portion of each of the third and fourth grilles lying below said normally horizontal plane, the third grille extending outwardly of the axis of the duct towards the said wall, and the fourth grille extending from the said wall towards the duct axis, each of the third and fourth grilles being of less extent measured in a direction radially of the axis of the duct than the radial extent of the duct itself, that edge of the fourth grille which is closest to the axis of the duct being spaced downstream of that edge of the third grille which is remote from the axis of the duct to provide an air-intake by-passing the third and fourth grilles, that edge of the third grille which is remote from the axis of the duct being of greater radial extent than the radial extent of that edge of the fourth grille which is closest to the axis of the duct, the second and third grilles encircling the axis of the duct, and means supporting each of said grilles against displacement within the duct.

2. A debris guard according to claim 1, in which the first grille is provided by a series of sub-grilles each arranged coaxially of the axis of the duct and each at least simulating a sector of an annulus, that edge of each sub-grille which is remote from the axis of the duct being positioned downstream of that edge of the next radially outer sub-grille which is closest to the axis of the duct, that edge of each sub-grille which is remote from the axis of the duct being of at least equal and radial extent to the radial extent of that edge of the said next radially outer sub-grille which is closest to the axis of the duct.

3. A debris guard according to claim 1, in which the fourth grille is provided by a series of sub-grilles each arranged coaxially of the axis of the duct and each simulating a sector of an annulus, that edge of each sub-grille which is remote from the axis of the duct being positioned upstream of that edge of the next radially outer sub-grille which is closest to the axis of the duct, that edge of each sub-grille which is remote from the axis of the duct being of at least equal radial extent to the radial extent of that edge of the said next radially outer sub-grille which is closest to the axis of the duct.

4. A debris guard for an air-intake duct having a longitudinal axis normally positioned in a substantially horizontal plane, comprising means for permitting a flow of air in a direction axially of the duct and for impeding or preventing the passage of discrete bodies of above a predetermined size in all directions downstream of the duct other than in a direction which is transverse to and inclined upwardly to said horizontal plane, while at all times providing for the unobstructed passage of a flow of air in said direction which is transverse to and inclined upwardly to said horizontal plane, said means including a wall defining the duct, a first, a second, a third and a fourth grille each arranged transversely of the longitudinal axis of the duct for the grilles in combination completely to mask the duct when the duct is viewed in an axial direction, the first and fourth grille at least simulating a sector of an annulus, the major portion of each of the first and second grilles lying above a normally horizontal plane which includes the axis of the duct, the first grille extending from the wall defining the duct towards the duct axis, and the second grille extending outwardly of the axis of the duct towards the said wall, each of the first and second grilles being of less extent measured in a direction radially of the axis of the duct than the radial extent of the duct itself, that edge of the second grille which is remote from the axis of the duct being spaced downstream of that edge of the first grille which is closest to the axis of the duct to provide an air-intake by-passing the first and second grille and being of at least equal radial extent to the radial extent of that edge of the first grille which is closest to the axis of the duct, the major portion of each of the third and fourth grilles lying below said normally horizontal plane, the third grille extending outwardly of the axis of the duct towards the said wall, and the fourth grille extending from the said wall towards the duct axis, each of the third and fourth grilles being of less extent measured in a direction radially of the axis of the duct than the radial extent of the duct itself, that edge of the fourth grille which is closest to the axis of the duct being spaced downstream of that edge of the third grille which is remote from the axis of the duct to provide an air-intake by-passing the third and fourth grilles, that edge of the third grille which is remote from the fourth axis of the duct being of greater radial extent than the radial extent of that edge of the fourth grille which is closest to the axis of the duct, a baffle extending axially and transversely of the duct and providing a transition between each of the adjacent ends of the first, second, third and fourth grilles, and means supporting each of said grilles against displacement within the duct.

5. A debris guard according to claim 4 in which the first grille is provided by a series of sub-grilles each arranged coaxially of the axis of the duct and each at least simulating a sector of an annulus, that edge of each sub-grille which is remote from the axis of the duct being positioned downstream of that edge of the next radially outer sub-grille which is closest to the axis of the duct, that edge of each sub-grille which is remote from the axis of the duct being of at least equal radial extent to the radial extent of that edge of the said next radially outer sub-grille which is closest to the axis of the duct.

6. A debris guard according to claim 4 in which the fourth grille is provided by a series of sub-grilles each arranged coaxially of the axis of the duct and each simulating a sector of an annulus, that edge of each sub-grille which is remote from the axis of the duct being positioned upstream of that edge of the next radially outer sub-grille which is closest to the axis of the duct, that edge of each sub-grille which is remote from the axis of the duct being of at least equal radial extent to the radial extent of that edge of the said next radially outer sub-grille which is closest to the axis of the duct.

7. A debris guard for an air-intake duct of substantially circular cross-section and having a longitudinal axis normally positioned in a substantially horizontal plane, comprising means for permitting a flow of air in a direction axially of the duct and for impeding or preventing the passage of discrete bodies of above a predetermined size in all directions downstream of the duct other than in a direction which is transverse to and inclined upwardly to said horizontal plane, while at all times providing for the unobstructed passage of a flow of air in said direction which is transverse to and inclined upwardly to said horizontal plane, said means including a wall defining the duct, a first grille positioned in the duct and at least simulating a sector of an annulus, the first grille extending from the wall of the duct towards the axis of the duct, transversely of and coaxial with the longitudinal axis of the duct, for its edge which is closest to the axis of the duct to lie intermediate the wall and the axis, the first grille subtending an angle of not more than 180° with the axis of the duct and being oriented above the axis of the duct for the subtended angle to be bisected by a normally vertical plane which includes the axis of the duct, a second grille positioned in the duct and extending outwardly of the axis of the duct towards the said wall transversely of and coaxial with the longitudinal axis of the duct, that edge of the second grille which is remote from the axis of the duct being of at least equal radial extent to the radial extent of that edge of the first grille which is closest to the axis of the duct and being positioned downstream of at least that edge of the first grille which is closest to the axis of the duct, the second grille subtending an angle of not more than 180° and being oriented above the axis of the duct for the said normally vertical plane to bisect its subtended angle, a third grille positioned in the duct and extending outwardly of the axis of the duct towards the said wall transversely of and coaxial with the longitudinal axis of the duct, for its edge remote from the axis of the duct to lie intermediate the wall and the axis of the duct, a fourth grille positioned in the duct and at least simulating a sector of an annulus, the fourth grille extending from the wall of the duct towards the axis of the duct transversely of and coaxial with the longitudinal axis of the duct, that edge of the third grille which is remote from the axis of the duct being of at least equal radial extent to the radial extent of that edge of the fourth grille which is closest to the axis of the duct, that edge of the fourth grille which is closest to the axis of the duct being positioned downstream of at least that edge of the third grille which is remote from the axis of the duct, the third and fourth grilles in combination with the first and second grilles completely masking the duct when viewed in an axial direction, and means supporting the first, second, third and fourth grilles against displacement axially of the said duct.

8. A debris guard for an air-intake duct of substantially annular cross-section and having a longitudinal axis normally positioned in a substantially horizontal plane, comprising means for permitting a flow of air in a direction axially of the duct and for impeding or preventing the passage of discrete bodies of above a predetermined size in all directions downstream of the duct other than in a direction which is transverse to and inclined upwardly to said horizontal plane, while at all times providing for the unobstructed passage of a flow of air in said direction which is transverse to and inclined upwardly to said horizontal plane, said means including an outer wall and an inner wall defining the annular duct, a first grille positioned in the duct and at least simulating a sector of an annulus, the first grille extending from the outer wall of the duct towards the inner wall, transversely of and coaxial with the longitudinal axis of the duct, for its edge closest to the axis of the duct to lie intermediate the inner and outer walls, the first grille subtending an angle of not more than 180° with the axis of the duct and being oriented above the axis of the duct for the subtended angle to be bisected by a normally vertical plane which includes the axis of the duct, a second grille positioned in the duct coaxial with the first grille and at least simulating a sector of an annulus, the second grille extending from the inner wall of the duct towards the outer wall transversely of the longitudinal axis of the duct, that edge of the second grille which is remote from the inner wall being of at least equal radial extent to the radial extent of that edge of the first grille which is closest to the inner wall and being positioned downstream of at least that edge of the first grille which is closest the inner wall, the second grille subtending an angle of not more than 180° and being oriented above the axis of the duct for the said normally vertical plane to bisect its subtended angle, a third grille positioned in the duct and at least simulating an annular sector, the third grille extending from the inner wall of the duct towards the outer wall transversely of and coaxial with the longitudinal axis of the duct for its edge remote from the inner wall to lie intermediate the inner and outer walls, a fourth grille positioned in the duct and at least simulating a sector of an annulus, the fourth grille extending from the outer wall of the duct towards the inner wall transversely of and coaxial with the longitudinal axis of the duct, that edge of the third grille which is remote from the inner wall being of at least equal radial extent to the radial extent of that edge of the fourth grille which is closest to the axis of the duct, that edge of the fourth grille which is closest to the axis of the duct being positioned downstream of at least that edge of the third grille which is remote from the axis of the duct, the third and fourth grilles in combination with the first and second grilles completely masking the duct when viewed in an axial direction, and means supporting the first, second, third and fourth grilles against displacement axially of the said duct.

9. A debris guard for an annular air-intake duct having a longitudinal axis normally positioned in a substantially horizontal plane comprising means for permitting a flow of air in a direction axially of the duct and for impeding or preventing the passage of discrete bodies of above a predetermined size in all directions downstream of the duct other than in a direction which is transverse to and inclined upwardly to said horizontal plane, while at all times providing for the unobstructed passage of a flow of air in said direction which is transverse to and inclined upwardly to said horizontal plane, said means including an inner wall and an outer wall defining the annular duct, a first sector of an annular grille positioned in said duct and extending from the outer wall of the duct towards the inner wall, transversely of and coaxial with the longitudinal axis of the duct, for that edge of the first annular grille which is closest the inner wall to lie intermediate the inner and outer walls, said first annular grille subtending an angle of not more than 180° with the axis of the duct and being oriented above the axis of the duct for the subtended angle to be bisected by a normally vertical plane which includes the axis of the duct, a second sector of an annular grille positioned in the duct coaxial with the first annular grille and extending from the inner wall of the duct towards the outer wall transversely of the longitudinal axis of the duct, that edge of the second annular grille which is remote from the inner wall being of a radius at least equal to the radius of that edge of the first annular grille which is closest to the inner wall and the angle subtended by that edge of the second annular grille which is remote from the inner wall being equal to the angle subtended by that edge of the first annular grille which is closest to the inner wall, that edge of the second annular grille which is remote from the inner wall being positioned downstream of at least that edge of the first annular grille which is closest to the inner wall and being oriented above the axis of the duct for the said normally vertical plane to bisect its subtended angle, a third sector of an annular grille positioned in the duct and extending from the inner wall of the duct towards the outer wall transversely of the longitudinal axis of the duct for its edge remote from the inner wall to lie intermediate the inner and outer walls, a fourth sector of an annular grille positioned in the duct and extending from the outer wall of the duct towards the inner wall, transversely of and coaxial with the longitudinal axis of the duct, that edge of the third annular grille which is remote from the inner wall being of at least equal radius to the radius of that edge of the fourth annular grille which is closest to the inner wall, that edge of the fourth annular grille which is closest to the inner wall being positioned downstream of at least that edge of the third annular grille which is remote from the inner wall, the third and fourth annular grilles in combination with the first and second annular grilles completely masking the duct when viewed in an axial direction, and means supporting the first, second, third and fourth annular grilles against displacement axially of the said duct.

10. A debris guard for an annular air-intake duct having a longitudinal axis normally positioned in a substantially horizontal plane, comprising means for permitting a flow of air in a direction axially of the duct and for impeding or preventing the passage of discrete bodies of above a predetermined size in all directions downstream of the duct other than in a direction which is transverse to and inclined upwardly to said horizontal plane, while at all times providing for the unobstructed passage of a flow of air in said direction which is transverse to and inclined upwardly to said horizontal plane, said means including an inner wall and an outer wall defining the duct, a first sector of a frusto-conical annular grille positioned in said duct and extending from the outer wall of the duct towards the inner wall, transversely of and coaxial with the longitudinal axis of the duct, for that edge of the first annular grille which is closest to the inner wall to lie intermediate the inner and outer walls and upstream of its edge adjacent the outer wall, the first annular grille subtending an angle of not more than 180° and being oriented above the axis of the duct for the subtended angle to be bisected by a normally vertical plane which includes the axis of the duct, a second sector of an annular grille positioned in the duct, coaxial with the first annular grille and extending radially of the duct from the inner wall of the duct towards the outer wall, the radius of that edge of the second annular grille which is remote from the inner wall being at least equal to the radius of that edge of the first annular grille which is closest to he inner wall and the angle subtended by the second annular grille being equal to the angle subtended by the first annular grille, the second annular grille being positioned downstream of at least that edge of the first annular grille which is closest the axis of the duct oriented above the axis of the duct for the said normally vertical plane to bisect its subtended angle, a third sector of a frusto-conical annular grille positioned in the duct and extending from the inner wall of the duct towards the outer wall, transversely of and coaxial with the longitudinal axis of the duct, for that edge of the third annular grille which is remote from the inner wall to be substantially coplanar with that edge of the first annular grille which is closest to the inner wall, that edge of the third grille which is remote from the inner wall being of equal radius to that edge of the first annular grille which is closest to the inner wall, a fourth sector of an annular grille positioned in the duct for it to be substantially coplanar with the second annular grille and extending radially of the duct from the outer wall of the duct towards the inner wall, that edge of the fourth annular grille which is closest to the inner wall being of equal radius to that edge of the second grille which is remote from the inner wall, the third and fourth annular grilles in combination with the first and second annular grilles completely masking the duct when viewed in an axial direction, means supporting the first, second, third and fourth annular grilles against displacement axially of the said duct, and a baffle extending axially and transversely of the duct and providing a transition between each of the adjacent ends of the first, second, third and fourth annular grilles.

References Cited in the file of this patent

UNITED STATES PATENTS 2,835,342     Hockert _____ May 20, 1958